Sept. 10, 1968
J. D. EKSTRAND
3,400,482
CASTING BOBBER
Filed Oct. 7, 1965
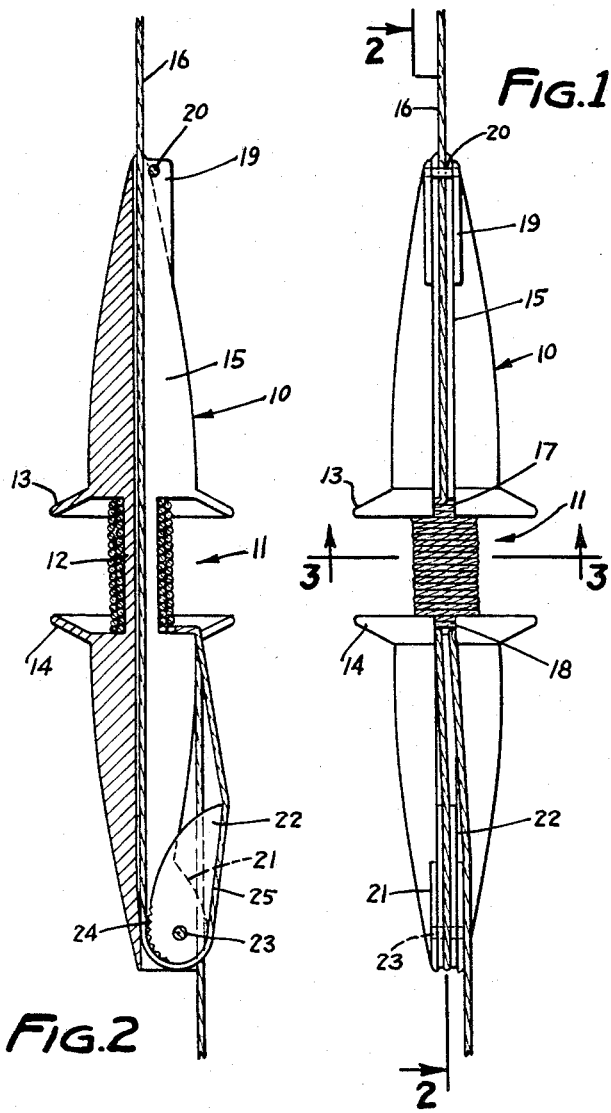
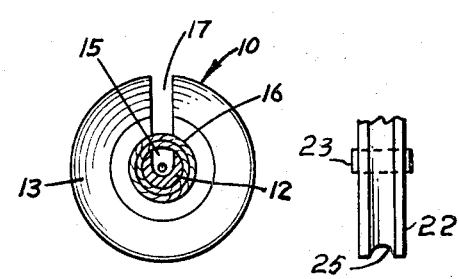
INVENTOR.
JEROME D. EKSTRAND
BY
Braddock+Burd
ATTORNEYS

United States Patent Office 3,400,482
Patented Sept. 10, 1968

3,400,482
CASTING BOBBER
Jerome D. Ekstrand, 3669 South 4400 West,
Salt Lake City, Utah 84104
Filed Oct. 7, 1965, Ser. No. 493,647
6 Claims. (Cl. 43—43.11)

ABSTRACT OF THE DISCLOSURE

A casting bobber for use by fishermen in deep water and characterized by provision of a line storing spool and means for releasably securing the line to the bobber. The required length of fish line between the bobber and sinker and hook necessary to suspend the hook at the desired depth below the surface of the water is wound on the spool before casting and secured. When the bobber strikes the water, the line unwinds from the spool but remains secured. When the line is reeled in, the line releases from the bobber to permit all of the line to be reeled in.

---

This invention relates to bobbers used by fishermen for casting in deep water. The bobber is characterized by means for storage during casting of the required length of fish line between the bobber and the sinker and hook necessary to suspend the hook at the desired depth below the water surface. This permits control of the line while casting, but without the bobber preventing reeling the line in beyond the point at which the bobber is attached to the line.

The invention is illustrated in the accompanying drawings in which the same numerals designate corresponding parts and in which:

FIGURE 1 is a side elevation of the bobber;
FIGURE 2 is a longitudinal section on the line 2—2 of FIGURE 1 and in the direction of the arrows;
FIGURE 3 is a transverse section on the line 3—3 of FIGURE 1 and in the direction of the arrows; and
FIGURE 4 is a fragmentary side elevation of a line locking cam utilized in the form of bobber shown in FIGURES 1 and 2.

Referring now to the drawings, and particularly to FIGURES 1 to 3, the casting bobber according to the present invention comprises a buoyant elongated ovoid body, indicated generally at 10. Approximately midway between its ends the body 10 is provided with a line storage section, indicated generally at 11, and in the form of a spool having a cylindrical core 12 disposed between a pair of circular end flanges 13 and 14. The inside surfaces of flanges 13 and 14 preferably taper slightly inwardly from their outer peripheries in the direction toward the adjacent end of the body. The tapered walls minimize build-up of line against the flanges as the line is wound about the storage spool and provide a more uniform distribution of line on the spool and decrease the possibility of the line unreeling during casting. The degree of taper is slight and may vary, for example, between about 10° and 30° relative to a transverse plane.

An open longitudinal radial fish line-receiving channel or slot 15 extends the length of the bobber body. The channel or slot 15 is relatively deep, extending to the longitudinal centerline of the body 10, so that when a fish line 16 is positioned in the channel it lies approximately along the longitudinal axis of the body. Spool flange 13 is provided with a radial slot 17 and spool flange 14 is provided with a radial slot 18, both of which are aligned with and comprise extensions of channel 15. A pair of closely spaced parallel fins 19 are provided on opposite sides of channel 15 adjacent one end of the body. A pin 20 extends between fins 19 to assist in retaining line 16 in the channel.

A pair of closely spaced parallel fins 21 are disposed on opposite sides of the channel 15 at the opposite end of the body 10. A relatively flat eccentric line locking cam 22 is disposed between fins 21 partially in channel 15, pivotally mounted on pin 23 extending between fins 21. Cam 22 has an arcuate heel portion 24 whose edge is preferably serrated, disposed largely within channel 15. This serves to engage line 16 in clamping engagement when the cam is rotated in counterclockwise direction (as viewed in FIGURE 2) so as to secure the line between the bottom of the channel and the cam edge. Cam 22 is also provided with a longitudinally grooved edge 25 which extends inward from the end of the body, when the cam is in the locked position shown in FIGURE 2, to receive and guide the line 16 toward the line storage spool.

In the use of the bobber, the free end of the fish line 16 from the reel of a conventional rod and reel assembly is threaded into channel 15 behind pin 20, laid in the bottom of the channel the length of the body through slots 17 and 18 and threaded behind cam 22. Cam 22 is rotated clockwise (as viewed in FIGURE 2) on its eccentric pivot to its unlocked position to provide the maximum line passage. The conventional hook and sinker assembly is then attached to the free end of the line. Enough fish line is pulled through the bobber until its length corresponds to the desired fishing depth. Then, the bobber is clamped onto the line by rotating cam 22 to cause clamping engagement between the serrated edge 24 and the line and between the line and the bottom of the channel. It will be observed that any force exerted from the hook end of the line only tends to tighten the clamping action of the cam.

The free length of line is then passed around cam 22, up through the grooved edge 25 and through slot 18 of flange 14, and wrapped around the line storage spool. The line is wrapped on the spool, care being taken to wind the line as uniformly as possible. The inward taper on the inside walls of the flanges assists in this. Then, the short segment of line bearing the hook and sinker assembly is led back out through slot 18 and the bobber is ready for casting.

When the cast is made, the bobber lays in the water on its side. The weight of the hook and sinker causes the bobber body to turn until the slot 18 is directed downward. This permits the end segment of line carrying the hook and sinker to free itself from engagement with slot 18. Then, the weight of the hook and sinker causes the line to unwind, which in turn causes the bobber to rotate on its longitudinal axis. When all of the line is unwound from the storage spool, the inner end of the line also becomes disengaged from slot 18 and the line is then supported from the cam lock end of the bobber. The weight of the hook and sinker is then carried by that end of the bobber, raising the other end for better visibility.

When the line is reeled in, because a fish is caught or otherwise, the bobber travels with the line until it engages the end of the rod and cannot pass the end line guide. Then, as the line is continued to be reeled in, the force exerted by the line acting on the serrated edge 24 of the locking cam 22 causes the cam to be rotated in a clockwise direction, as viewed in FIGURE 2. This causes the cam to unlock its clamping grip on the line and permits the line to be drawn through the bobber body until the cam lock end of the body is engaged by the sinker.

I claim:
1. A deep water casting bobber comprising:
(A) a rigid, generally symmetrical, buoyant bobber body having a longitudinal axis of rotation and a longitudinal line-receiving channel extending from the side of said body to said axis,
(B) said body having an intermediate line storage spool disposed midway between the ends of said bobber body to rotate on said longitudinal axis, (C) spaced apart circular flanges defining opposite ends of said line storage spool, (D) a radial slot in the outer peripheral edge of each said flanges, said radial slots extending inwardly to the bobber body and forming a continuation of said longitudinal channel, and (E) means for releasably securing said bobber body to a fish line.

2. A bobber according to claim 1 further characterized in that the inside walls of said flanges taper inwardly from their outer peripheries toward the adjacent end of the bobber body, whereby the outer peripheries of the flanges are spaced apart by a lesser distance than the inner peripheries adjacent the core of the spool.

3. A deep water casting bobber comprising:
(A) a rigid, generally symmetrical, buoyant bobber body having a longitudinal axis of rotation, and a longitudinal line-receiving channel extending from the side of said body to said axis,
(B) said body having an intermediate line storage spool disposed
  (1) midway between the ends of said bobber body
  (2) to rotate on said longitudinal axis,
(C) a pair of spaced apart circular flanges defining opposite ends of said line storage spool,
(D) the inside walls of said flanges tapering inwardly from their outer peripheries toward the adjacent end of the bobber body whereby the outer peripheries are spaced apart by a lesser distance than the inner peripheries adjacent the core of the spool,
(E) a radial slot in the outer peripheral edge of each of said flanges, said radial slots extending inwardly to the bobber body and forming a continuation of said longitudinal channel, and
(F) means for releasably securing said bobber body to a fish line.

4. A deep water casting bobber comprising:
(A) a buoyant bobber body having a longitudinal axis of rotation,
(B) an open longitudinal radial line-receiving channel extending the length of said bobber body, said channel extending inwardly from the body surface and having a depth extending to the longitudinal axis of the body whereby a line received in the channel lies substantially along the longitudinal axis,
(C) an intermediate line storage spool disposed between the ends of said bobber body to rotate on said longitudinal axis,
(D) spaced apart circular flanges defining opposite ends of said line storage spool,
(E) a radial slot in the outer peripheral edge of each of said flanges, said radial slots in said flanges being in alignment with said line-receiving channel, and
(F) means for releasably securing said bobber body to a fish line, said line securing means including an eccentric cam pivotally mounted on said bobber body adjacent one end thereof with one arcuate line-engaging edge disposed in said channel for clamping engagement of said line against the bottom wall of said channel and another line-engaging edge extending longitudinally along the outside of the bobber body, said cam being rotatable upon application of force from the fish hook end of the line to tighten its clamping engagement and rotatable upon application of force from the reel end of the line to release the line.

5. A bobber according to claim 4 further characterized in that arcuate line-engaging edge surface of said cam is serrated and the other line-engaging edge surface extending along the outside of the bobber body is grooved to receive and guide the line longitudinally toward said line storage spool.

6. A deep water casting bobber comprising:
(A) a buoyant bobber body having a longitudinal axis of rotation,
(B) an open longitudinal radial line-receiving channel extending the length of said bobber body,
(C) said channel extending inwardly from the body surface and having a depth extending to the longitudinal axis of the body whereby a line received in the channel lies substantially along the longitudinal axis,
(D) an intermediate line storage spool disposed
  (1) midway between the ends of said bobber body
  (2) to rotate on said longitudinal axis,
(E) a pair of spaced apart circular flanges defining opposite ends of said line storage spool,
(F) the inside walls of said flanges tapering inwardly from their outer peripheries toward the adjacent end of the bobber body whereby the outer peripheries are spaced apart by a lesser distance than the inner peripheries adjacent the core of the spool,
(G) a radial slot in the outer peripheral edge of each of said flanges,
(H) said radial slots in said flanges being in alignment with said channel, and
(I) an eccentric line-securing cam
  (1) pivotally mounted on said bobber body adjacent one end thereof with
  (2) one arcuate serrated line-engaging edge disposed in said channel for clamping engagement of said line against the bottom wall of said channel and
  (3) another grooved line-engaging edge extending longitudinally along the outside of the bobber body to receive and guide the line longitudinally toward the line storage spool,
(J) said cam being rotatable upon application of force from the fish hook end of the line to tighten its clamping engagement and rotatable upon application of force from the reel end of the line to release the line.

References Cited

UNITED STATES PATENTS

| 755,683 | 3/1904 | Miller | 43—43.11 |
| 1,762,620 | 6/1930 | Fixen. | |
| 2,607,154 | 8/1952 | Martens | 43—43.11 |
| 2,722,768 | 11/1955 | Fleetwood | 43—43.11 X |
| 3,138,309 | 6/1964 | Hulterstrum | 43—43.11 X |
| 3,168,790 | 2/1965 | Creasey | 43—43.11 |

FOREIGN PATENTS

| 117,881 | 7/1958 | U.S.S.R. |

SAMUEL KOREN, *Primary Examiner.*

J. H. CZERWONKY, *Assistant Examiner.*